United States Patent [19]

Spain et al.

[11] Patent Number: 5,029,875
[45] Date of Patent: Jul. 9, 1991

[54] FLUID SEAL STRUCTURE

[75] Inventors: Raymond G. Spain; Carlos Bailey, both of Farmington Hills, Mich.

[73] Assignee: Textron Inc., Providence, R.I.

[21] Appl. No.: 376,698

[22] Filed: Jul. 7, 1989

[51] Int. Cl.$^5$ ............................................. F16J 15/447
[52] U.S. Cl. ........................................ 277/1; 277/53; 415/173.5; 415/174.5
[58] Field of Search ................ 277/1, 3, 27, 53, 54, 277/56, 95, 100, 230; 415/111–113, 171.1, 173.1, 173.3, 173.4, 173.5, 174.2, 174.4, 174.5; 384/144, 145, 480

[56] References Cited

U.S. PATENT DOCUMENTS

| | | |
|---|---|---|
| Re.30,206 | 2/1980 | Ferguson et al. . |
| 885,032 | 4/1908 | De Ferrant . |
| 2,878,048 | 3/1959 | Peterson . |
| 3,481,427 | 12/1969 | Dobbs et al. . |
| 3,701,536 | 10/1972 | Matthews et al. . |
| 3,702,220 | 11/1972 | Medawar et al. . |
| 3,778,184 | 12/1973 | Wood . |
| 3,825,364 | 7/1974 | Halila et al. . |
| 3,838,862 | 10/1974 | Fern ........................ 415/174.2 X |
| 3,890,060 | 6/1975 | Lipstein . |
| 4,202,544 | 5/1980 | Snell . |
| 4,209,268 | 6/1980 | Fujiwara et al. .................. 277/53 X |
| 4,274,575 | 6/1981 | Flower . |
| 4,358,120 | 11/1982 | Moore . |
| 4,415,309 | 11/1983 | Atterbury . |
| 4,452,335 | 6/1984 | Mathews et al. . |
| 4,526,509 | 7/1985 | Gay, Jr. et al. .................. 415/173.3 |
| 4,531,362 | 7/1985 | Barry et al. . |
| 4,536,127 | 8/1985 | Rossmann et al. . |
| 4,595,207 | 6/1986 | Popp ................................... 277/1 X |
| 4,600,202 | 7/1986 | Schaeffler et al. . |
| 4,632,404 | 12/1986 | Feldle et al. ....................... 277/95 X |
| 4,678,113 | 7/1987 | Bridges et al. . |
| 4,704,332 | 11/1987 | Brennan et al. . |
| 4,756,536 | 7/1988 | Belcher . |
| 4,846,592 | 7/1989 | Tsumori et al. .................. 277/95 X |

FOREIGN PATENT DOCUMENTS

| | | | |
|---|---|---|---|
| 2344666 | 3/1974 | Fed. Rep. of Germany ........ | 277/53 |
| 839731 | 6/1960 | United Kingdom .................. | 277/53 |
| 1417969 | 12/1975 | United Kingdom .................. | 277/53 |

*Primary Examiner*—William A. Cuchlinski, Jr.
*Assistant Examiner*—Scott Cummings
*Attorney, Agent, or Firm*—Reising, Ethington, Barnard, Perry & Milton

[57] ABSTRACT

An annular fluid seal is provided between a pair of spaced apart machine components, such as a rotor and a stator. The rotatable component includes an annular sealing surface of increasing diameter in a given direction (e.g., along its length or along a radially extending shoulder). An annular fibrous sealing element is disposed proximate the clearance space between the components in such a manner that a sealing portion thereof engaging the other component moves in the direction of increasing diameter as the sealing portion may wear so as to maintain sealing contact with the annular sealing surface. A fluid seal is thereby maintained between the components.

19 Claims, 2 Drawing Sheets

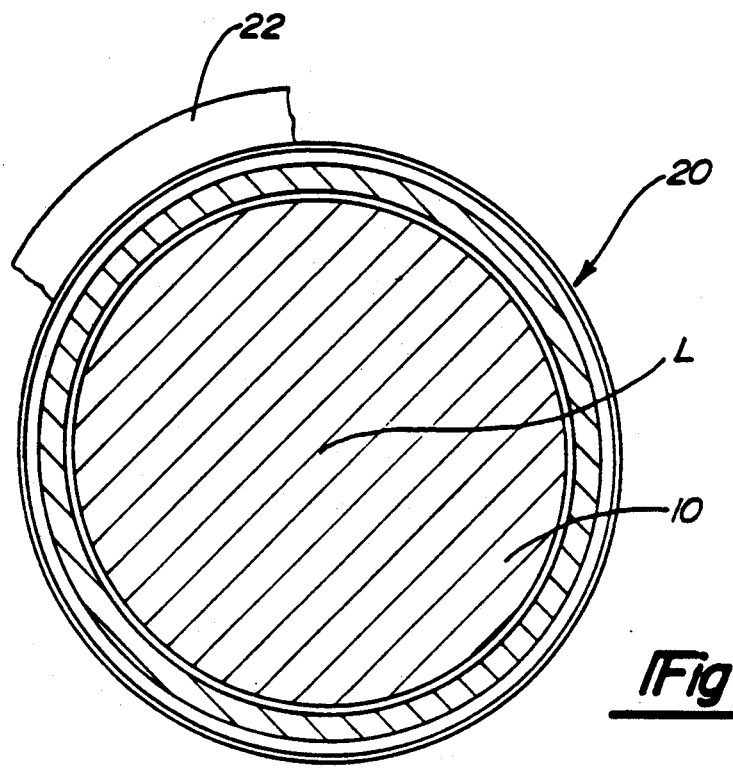
*Fig-1*
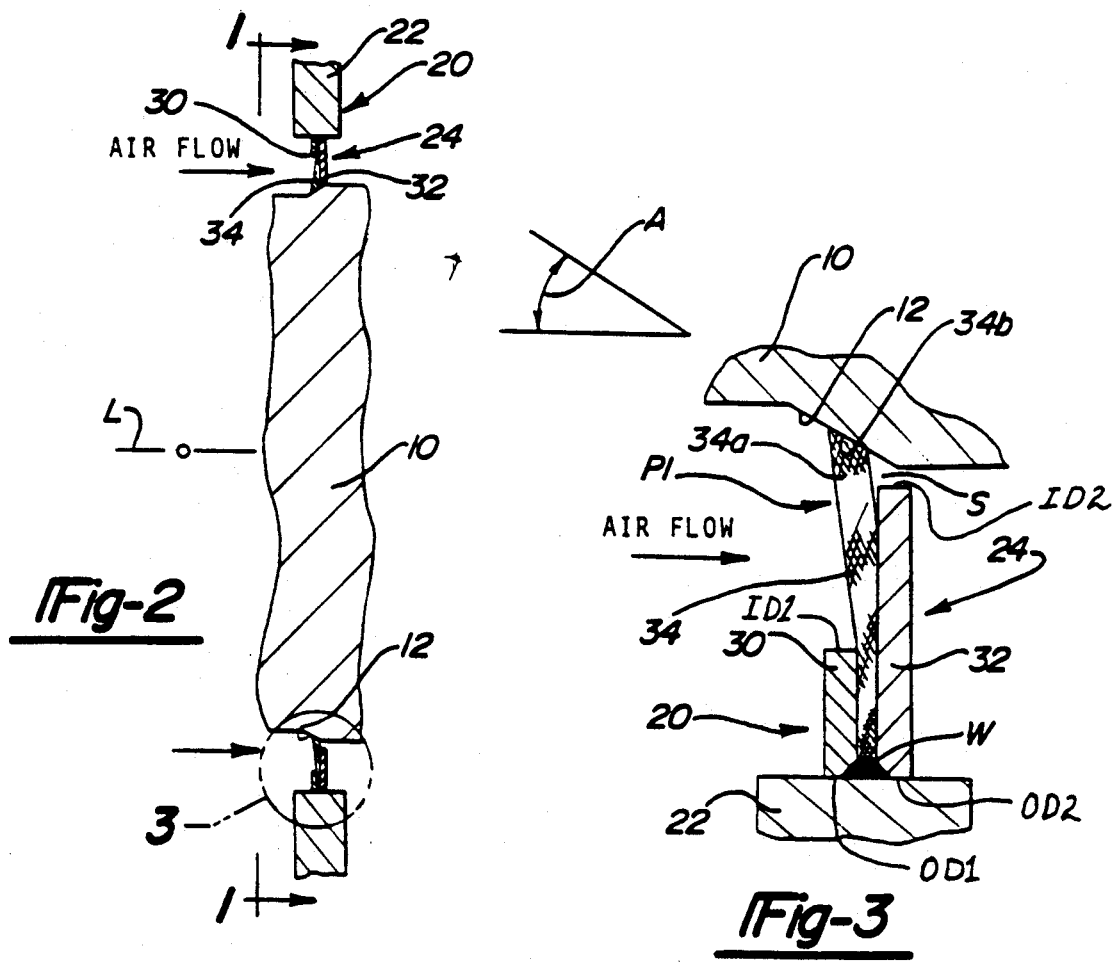
*Fig-2*
*Fig-3*

FLUID SEAL STRUCTURE

FIELD OF THE INVENTION

The invention relates to seals and, more particularly, to flexible braided filamentary seals for use between spaced components of a machine.

BACKGROUND OF THE INVENTION

With seals between relatively moving machine components, the danger exists that the components may approach one another to a point where severe friction between the components may cause excessive heating and possible destruction of the seal. This is a particular problem in gas turbine engines which have many high speed components rotating relative to stationary components carrying sealing elements thereon.

In one attempt to address this problem, an abradable coating has been provided on the stationary component or rotating component. The coating is gradually worn away by contact with the other component and, as a result, the clearance between the components is increased and sealing efficiency is reduced.

In another attempt to solve this problem, a so-called brush seal is carried on one of the machine components and includes tightly packed bristles to engage the other adjacent component rotatable relative thereto to effect fluid sealing between the components. U.S. Pat. Nos. 885,032; 2,878,048; 4,202,554; 4,358,120; and U.S. Reissue No. 30,206 illustrate such brush seals. Various fabrication techniques have been employed to make such brush seals. Many of these fabrication techniques are slow, costly and labor intensive. U.S. Pat. No. 4,415,309 illustrates a technique for fabricating a brush seal for a gas turbine engine wherein the sealing element is formed as a woven fabric having metallic warp filaments, metallic weft filaments and metallic warp pile filaments. A portion of the fabric formed of the warp and weft filaments is brazed to one component of the gas turbine engine. The warp pile filaments are cut to form a brush seal for engaging the other component of the gas turbine engine.

Copending U.S. application Ser. No. 321,370 filed Mar. 9, 1989, of common assignee herewith discloses a three dimensionally braided filamentary sealing element for use between components in a gas turbine engine or other machine where a clearance space is provided between the components.

SUMMARY OF THE INVENTION

The invention contemplates use of a fluid seal, such as a brush seal or a three-dimensionally braided seal, between a pair of spaced apart components, such as a rotor and a stator, in such a manner as to maintain sealing contact as the seal may wear during use.

In a typical working embodiment of the invention, the fluid seal is used in combination with two components of a machine separated by an annular clearance space therebetween wherein one component is rotatable relative to the other component. An annular surface of increasing diameter in a given direction is provided on one of the components; for example, on the rotatable component. An annular fibrous sealing element is disposed on the other component proximate the clearance space between the components and includes a sealing portion for contacting the annular surface. Importantly, the sealing element is preloaded or biased relative to the annular surface in such a manner that the sealing portion moves in the given direction of increasing diameter as the sealing portion may wear so as to maintain contact between the sealing portion and the annular surface. A gas seal is thereby maintained between the components.

In particular, the sealing element is preloaded toward the annular sealing surface (i.e., in the given direction) to move the sealing portion in the direction of increasing diameter of the sealing surface. For example, the sealing portion can be canted relative to radii of the annular sealing surface to establish a desired preload on the sealing portion.

In one embodiment of the invention, the annular sealing surface comprises a frusto-conical surface on a rotatable member, the frusto-conical surface diverging in the given direction which extends along the length of the member.

In another embodiment of the invention, the annular sealing surface comprises a radially extending shoulder on the rotatable member. The radially extending shoulder increases in diameter in the radial direction.

The invention also contemplates a method of sealing an annular space between two machine components, one of which is rotatable, including the steps of forming an annular surface on one component such that the annular surface increases in diameter in a given direction and disposing an annular fibrous sealing element on the other component proximate the space between the components such that the sealing portion thereof contacts the annular surface and moves in the direction of increasing diameter as the sealing portion wears to maintain contact between the sealing portion and the annular surfaces.

DETAILED DESCRIPTION OF THE DRAWINGS

FIG. 1 is a schematic cross-sectional view of a gas turbine rotor member; e.g., a rotary shaft, showing a gas seal assembly disposed therearound taken along lines 1—1 of FIG. 2.

FIG. 2 is a partial cross-sectional view along the length of the shaft.

FIG. 3 is an enlargement of the encircled portion of FIG. 2.

DETAILED DESCRIPTION OF CERTAIN EMBODIMENTS

Figure 4:
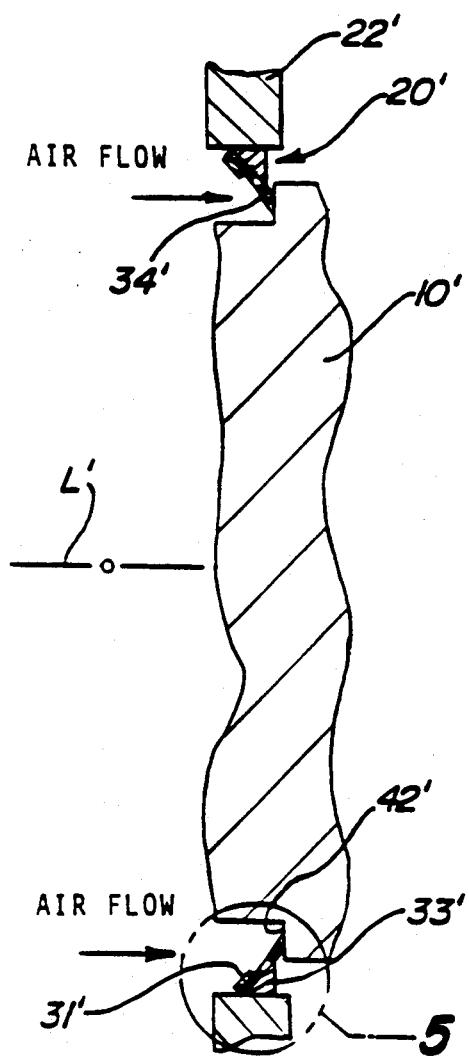
FIG. 4 is similar to FIG. 2 but of another embodiment of the invention where the rotor member includes a radially extending annular shoulder and a gas seal assembly disposed therearound at an orientation different from that shown in FIGS. 1-3.

With reference to FIGS. 1-3, a rotary member 10 is schematically shown. The rotary member 10 may comprise the rotor of a conventional axial flow gas turbine engine. In such an engine, there is axial gas flow (compressed air) along the length of the rotary member 10 as illustrated by the arrows in FIGS. 2-3. The rotary member 10 is mounted for rotation about longitudinal axis L, all as is well known.

An annular stator enclosure 20 is provided about the rotary member 10 and includes an outer annular casing or liner 22 that may be part of or fastened to one of the engine ducts (not shown). Fastened on the inner periphery of the casing or liner 22 is an annular fluid (gas) seal assembly 24. The seal assembly 24 includes an annular upstream support plate 30, an annular downstream support plate 32 and an annular fibrous, resilient sealing element 34 mounted between the support plates 30,32; e.g., by being welded thereto at W about the outer diameters OD1,OD2 of the support plates 30,32. As shown, the outer diameters OD1,OD2 of support plates 30,32 relative to axis L are substantially equal.

The sealing element 34 preferably comprises a three-dimensionally braided filamentary seal of the type described in copending U.S. patent application Ser. No. 292,482 abandoned in favor of commonly assigned Ser. No. 321,370 now U.S. Pat. No. 4,989,886 of common assignee herewith, the teachings of which are incorporated herein by reference. Such braided filamentary sealing elements exhibit size/shape restorative capabilities and compliancy/resiliency to accommodate thermal and/or dynamic displacements of the rotary member 10 and enclosure 20 relative to one another during use. The sealing portion 34a of the sealing element may comprise an integral braided sealing surface or, alternatively, three-dimensionally braided filaments having a free length in a radial direction toward the rotor shaft 10; e.g., as explained in the aforementioned application Ser. No. 292,482, now U.S. Pat. No. 4,989,886.

Moreover, resilient brush seals of the type described in U.S. Pat. Nos. 4,202,554; 4,358,120; 4,415,309 and Reissue No. 30,206, the teachings of which are incorporated herein by reference, may also be used in the invention.

Those skilled in the art will appreciate that the sealing element 34 as well as support plates 30,32 can be made in arcuate segments and assembled together to form the stator enclosure 20; e.g., as explained in the aforementioned copending application Ser. No. 292,482.

Figure 6:
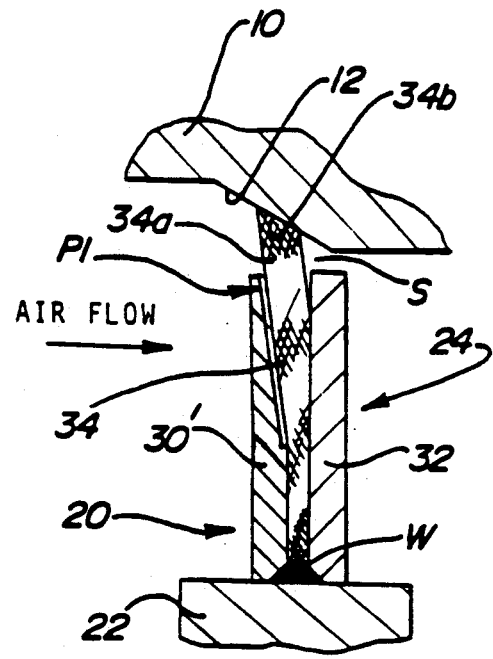
FIG. 6 is similar to FIG. 3 and shows another embodiment of the invention.

The sealing element 34 extends from between the support plates 30,32 toward an annular frusto-conical sealing surface 12 on the rotary member 10. In accordance with the invention, the annular sealing surface 12 increases in diameter in the longitudinal direction (i.e., along the longitudinal axis L in the direction of air flow). The sealing element 34 includes the sealing portion 34a disposed proximate (i.e., disposed adjacent or in) the radial clearance space S between the inner diameter ID2 of the downstream support plate 32 and the outer diameter of the shaft 12. As shown, the inner diameter ID2 of the downstream support plate 32 is smaller than that ID1 of the upstream support plate 30; i.e., plate 32 is closer to the rotor shaft 12 to minimize the radial clearance space S. However, the invention is not so limited; e.g., see FIG. 6 wherein the tapered upstream support plate 30, and the downstream support plate 32 have generally equal inner diameters relative to axis L.

The sealing portion 34a initially sealing contacts the annular sealing surface 12 at position P1 thereon. However, during use, the surface 34b of the sealing portion 34a in contact with the annular sealing surface 12 may wear away from the rubbing engagement. In accordance with the invention, the sealing portion 34a is preloaded in the direction of increasing diameter of the sealing surface 12 such that the sealing portion 34a moves in that direction as surface 34b wears. Movement of the sealing portion 34a in that axial direction causes it to move toward the increasing diameter of sealing surface 34a so as to maintain sealing contact therewith. As a result, a fluid (e.g., gas) seal is maintained between the rotor shaft 10 and the stator enclosure 20.

The amount of divergence or outward taper (i.e., increasing diameter) of the sealing surface 12 over a given length of the rotary member 10 is selected in dependence upon the expected wear over time of the sealing portion 34a so as to maintain a gas seal during that time.

The sealing portion 34a is preloaded or biased axially in the direction of increasing diameter of the sealing surface 12 in FIG. 1 as a result its engaging the sealing surface 12 at the angle or cant shown. In this embodiment, the sealing surface 12 extends at an acute angle A to axis L while the sealing portion 34a extends generally normal thereto. This relative canting of the sealing portion 34a and sealing surface 12, in combination with the resilience of the sealing portion 34a, provides the required preload or bias to move the sealing portion 34a toward the increasing diameter as it wears during use. The extent of divergence of the sealing surface 12 as well as radial length and resiliency of the sealing portion 34a can be selected to vary the amount of preload or bias thereon.

Figure 5:
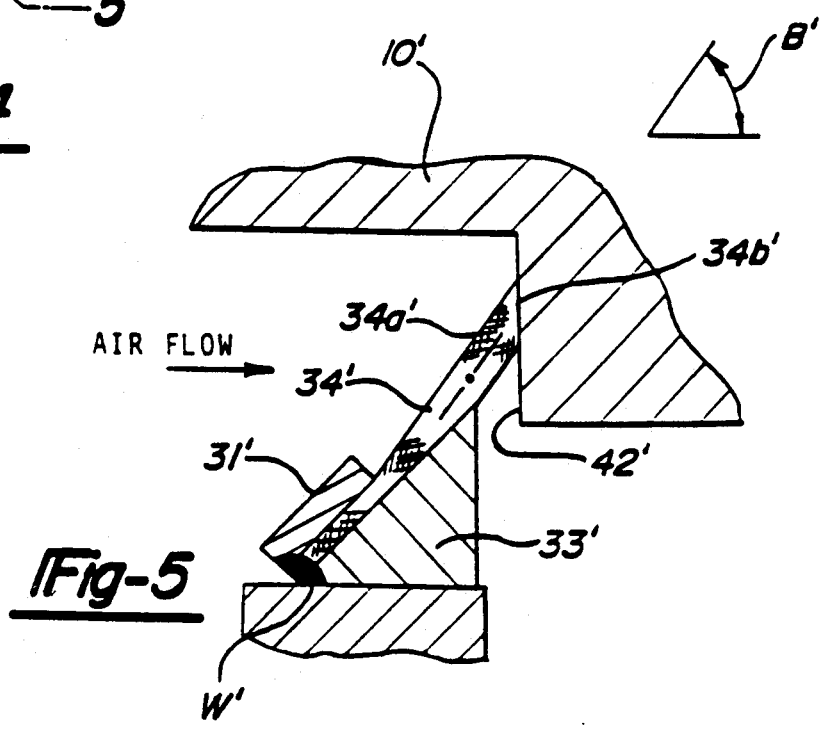
FIG. 5 is an enlargement of the encircled portion of FIG. 4.

With reference to FIGS. 4–5, another embodiment of the invention is illustrated using like reference numerals primed for like features of FIGS. 1–3. The embodiment of FIGS. 4–5 differs from that of FIGS. 1–3 in that a radially extending annular shoulder 42' is provided on rotary member 10' in lieu of the frusto-conical sealing surface 12. The annular shoulder 42' increases in diameter in a radial direction as will be apparent in FIGS. 4–5.

The embodiment of FIGS. 4–5 sandwiches the sealing element 34' between an annular upstream support plate 31' and an annular downstream support plate 33'. The sealing shoulder 42' extends generally normal to the axis L' while the sealing portion 34a' includes a longitudinal axis that extends at an acute angle B' thereto.

As the surface 34b' of the sealing portion 34a' wears away during use, the sealing portion 34a' is preloaded or biased (as described hereinabove for FIGS. 1–3) to move in the radial direction of increasing diameter of sealing shoulder 42' to maintain sealing contact therewith as will be apparent from FIG. 5. The canting (angle B') of the sealing portion 34a' as well as length and resiliency thereof are selected to vary the amount of preload or bias.

Although the invention has been illustrated and described hereinabove with respect to certain embodiments of the invention, those skilled in the art will appreciate that modifications can be made thereto within the scope of the invention as defined by the following claims.

I claim:

1. In a machine having two components which are separated by an annular clearance space and are generally concentric to a longitudinal axis, the components being relatively rotatable, the combination of one of said components having an annular surface of increasing diameter in a given direction and an annular resilient, fibrous sealing element disposed on the other of said components proximate the space between said components, said sealing element having a sealing portion for contacting said surface, said sealing element and said surface being relatively canted at an acute angle and in contact such that said sealing portion is biased in said direction of increasing diameter as said sealing portion may wear so as to maintain contact of said sealing portion against said surface, thereby maintaining a seal between said components.

2. The combination of claim 1 wherein said one of said components comprises a rotary member disposed coaxially with said longitudinal axis and said given direction is generally parallel to said longitudinal axis.

3. The combination of claim 2 wherein said surface comprises a frusto-conical surface on said rotary member, said frusto-conical surface diverging in said given direction at an acute angle to said longitudinal axis.

4. The combination of claim 3 wherein a portion of said sealing element is oriented generally normal to said axis.

5. The combination of claim 1 wherein said one of said components comprises a rotary member coaxially disposed with said longitudinal axis and said given direction is generally perpendicular to said longitudinal axis.

6. The combination of claim 5 wherein said surface comprises an annular, radially extending shoulder on said member.

7. The combination of claim 6 wherein a portion of said sealing element is oriented at an acute angle to said axis.

8. The combination of claim 1 wherein said sealing portion is canted relative to radii of said surface.

9. The combination of claim 1 wherein said sealing element is supported proximate said space by a static enclosure extending about one component which is rotatable.

10. The combination of claim 9 wherein said sealing element is sandwiched on opposite sides between a static axially upstream annular support plate and a static axially downstream annular support plate mounted on said static enclosure.

11. The combination of claim 10 wherein said axially downstream support plate includes a smaller inner diameter than that of said axially upstream support plate.

12. The combination of claim 11 wherein the upstream support plate and the downstream support plate are attached together.

13. The combination of claim 1 wherein said one of said components comprises a rotor of a gas turbine engine.

14. The combination of claim 13 wherein the other of said components comprises a static member of a gas turbine engine.

15. A method of sealing an annular space between two machine components that are concentric to a longitudinal axis, and are relatively rotatable, comprising:
   (a) forming an annular surface on one of said components such that said annular surface increases in diameter in a given direction, and
   (b) disposing an annular resilient fibrous sealing element on the other of said components proximate a space between the components such that a sealing portion thereof and said annular surface are relatively canted at an acute angle and in contact such that said sealing portion is biased in said direction of increasing diameter as said sealing portion wears so as to maintain contact between said sealing portion and said surface, thereby maintaining a seal between the components.

16. The method of claim 15 including forming said annular surface as a frusto-conical surface of increasing diameter along the length of a rotatable member constituting said one of said components, said frusto-conical surface defining an acute angle to said longitudinal axis.

17. The method of claim 16 including orienting a portion of said sealing element generally normal relative to said longitudinal axis.

18. The method of claim 15 including forming said annular surface as an annular, radially extending shoulder on a rotatable member constituting said one of said components.

19. The method of claim 18 including orienting a portion of the sealing element at an acute angle relative to said longitudinal axis.

* * * * *